US007606432B2

(12) United States Patent
Son et al.

(10) Patent No.: US 7,606,432 B2
(45) Date of Patent: Oct. 20, 2009

(54) APPARATUS AND METHOD FOR PROVIDING THUMBNAIL IMAGE DATA ON A MOBILE TERMINAL

(75) Inventors: Jae-Gon Son, Daegu (KR); Kang-Wook Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 970 days.

(21) Appl. No.: 10/988,577

(22) Filed: Nov. 16, 2004

(65) Prior Publication Data

US 2005/0123205 A1 Jun. 9, 2005

(30) Foreign Application Priority Data

Dec. 6, 2003 (KR) ............... 10-2003-0088386

(51) Int. Cl.
G06K 9/36 (2006.01)
(52) U.S. Cl. .................. 382/233; 382/232; 382/250
(58) Field of Classification Search ......... 382/232–233, 382/235–236, 250
See application file for complete search history.

(56) References Cited

U.S. PATENT DOCUMENTS 6,233,359 B1 * 5/2001 Ratnakar et al. ............ 382/250

FOREIGN PATENT DOCUMENTS

KR 98-65864 10/1998

* cited by examiner

Primary Examiner—Duy M Dang
(74) Attorney, Agent, or Firm—Roylance, Abrams, Berdo & Goodman, L.L.P.

(57) ABSTRACT

Apparatus and method for providing thumbnail image data on a mobile terminal are provided. The apparatus and method comprise determining whether an image management mode is selected when the mobile terminal is in a standby mode; analyzing bit streams of a plurality of stored actual images to obtain picture sizes and compression ratios of the actual images upon selection of the image management mode; extracting Discrete Cosine Transform (DCT) coefficients at certain blocks of the bit streams of the actual images based on the obtained picture sizes and compression ratios; and partially decoding the extracted DCT coefficients, reducing the partially decoded DCT coefficients at a predetermined rate for generating thumbnail images of the plurality of actual images and displaying the generated thumbnail images.

18 Claims, 3 Drawing Sheets

APPARATUS AND METHOD FOR PROVIDING THUMBNAIL IMAGE DATA ON A MOBILE TERMINAL

PRIORITY

This application claims the benefit under 35 U.S.C. 119(a) of an application entitled "Method for Providing Thumbnail Image Data on Mobile Terminal" filed with the Korean Intellectual Property Office on Dec. 6, 2003 and assigned Serial No. 2003-88386, the entire contents of which are hereby incorporated by reference.

BACKGROUND OF THE INVENTION

1. Field of the Invention

The present invention relates to an apparatus and method for providing thumbnail image data on a mobile terminal. More particularly, the present invention relates to an apparatus and method for generating thumbnails from image data stored in a mobile terminal.

2. Description of the Related Art

Mobile terminals have become integrated with cameras and now provide wireless communication as well as photography as an option and offer the convenience of allowing a user to take photographs anywhere and at any time. Image data of the pictures taken through the camera of a mobile terminal can be stored and reproduced whenever needed. The image data may include still images and moving images. Still images are compressed in a Joint Picture Experts Group (JPEG) format, while moving images are compressed in an Moving Picture Experts Group (MPEG) format. The compressed still and moving images are stored in the memory of the mobile terminal.

Specifically, the actual images photographed and their smaller images (hereinafter referred to as "thumbnails") reduced in size to be easily managed by the user are both stored in memory.

The user can display multiple thumbnail images simultaneously on a screen display using a multi-function capability available in the actual image data management mode.

Since conventional mobile terminals store both actual images and reduced-size thumbnail images, they have a limitation in storing all data (such as images and ringtone melodies/bell sounds) given the finite memory resources available.

SUMMARY OF THE INVENTION

Accordingly, the present invention has been made to solve the above-mentioned problems occurring in the prior art, and an object of the present invention is to provide an apparatus and method for providing thumbnail images on a mobile terminal only in a mode requiring thumbnail image data, without storing the thumbnail images with actual images in a memory.

Another object of the present invention is to provide an apparatus and method for providing thumbnail image data on a mobile terminal which can effectively utilize finite memory resources.

In order to accomplish the above objects of the present invention, an apparatus and method for providing thumbnail image data on a mobile terminal are used, comprising determining whether an image management mode is selected when the mobile terminal is in a standby mode; analyzing bit streams of a plurality of actual images stored to obtain picture sizes and compression ratios of the actual images upon selection of the image management mode; extracting Discrete Cosine Transform (DCT) coefficients at certain blocks of the bit streams of the actual images based on the obtained picture sizes and compression ratios; partially decoding the extracted DCT coefficients; and reducing the partially decoded DCT coefficients at a predetermined rate for generating thumbnail images of the plurality of actual images and displaying the generated thumbnail images.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, an embodiment of the present invention will be described with reference to the accompanying drawings. In addition, in the following description of the present invention, a detailed description of known functions and configurations incorporated herein will be omitted when for conciseness.

Image data includes still images compressed in Joint Picture Experts Group (JPEG) format and moving images compressed in Moving Picture Experts Group (MPEG) format. In this embodiment of the present invention, still images will be described as being image data. Also, the term "Discrete Cosine Transform (DCT) coefficient" will refer to both DC and AC coefficients.

Figure 1:
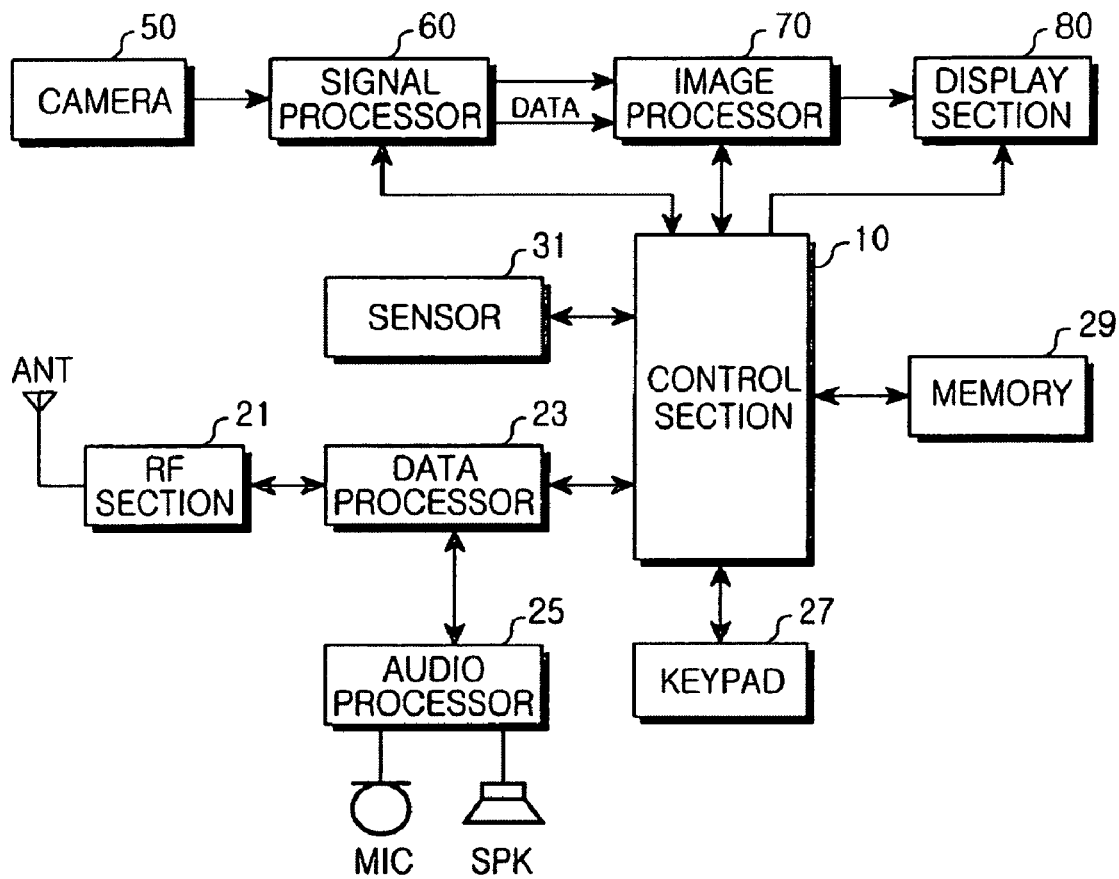
FIG. 1 is a view illustrating a mobile terminal according to an embodiment of the present invention.

FIG. 1 illustrates a mobile terminal according to an embodiment of the present invention.

Referring to FIG. 1, a radio frequency (RF) section 21 performs a wireless communication function for the mobile terminal. The RF section 21 comprises a RF transmitter (not shown) for performing upward conversion and amplification of the frequency of a transmitted signal and a RF receiver (not shown) for amplifying a received signal with low noise and performing downward conversion of the frequency of the signal.

A data processor 23 comprises a transmitter for coding and modulating a signal which is being transmitted and a receiver for demodulating and decoding a signal which is being received. The data processor 23 may comprise a modem and a codec.

An audio processor 25 reproduces an audio signal output from the data processor 23 to a speaker or transmits an audio signal generated from a microphone to the data processor 23. Also, the audio processor 25 reproduces audio data stored with moving images and outputs the audio data through the speaker.

A keypad 27 is provided with keys for inputting numbers and characters and function keys for setting up various functions. The key input section 27 may also include a menu key, an OK key and an image management key according to an embodiment of the present invention.

A memory 29 may comprise a program memory and a data memory. The program memory stores programs for controlling general operations of the mobile terminal and programs for compressing still images in JPEG format and moving images in MPEG format and storing the images. The data memory temporarily stores data generated during implementation of the above programs.

A control section 10 controls the overall operations of the mobile terminal. The control section 10 may include the data processor 23. When a multi-mode option is selected by an input from the keypad 27 during an image management mode, the control section 10 outputs image data stored in the memory 29 and controls the display of thumbnail images.

A camera 50 comprises a camera sensor for converting a photographed optical signal into an electrical signal. The camera sensor can be a charge coupled device (CCD) sensor. A signal processor 60 converts an image signal output from the camera 50 into digital data. The signal processor 60 can be a digital signal processor (DSP).

An image processor 70 generates picture data for displaying an image signal output from the signal processor 60. The image processor 70 adjusts image signals received under the control of the control section 10 or image data photographed through the camera 50 to conform to the size of a display section 80 and outputs the adjusted signals or data. In addition, the image processor 70 compresses the image data into a JPEG or MPEG format or reconstructs the compressed image data.

The display section 80 displays messages generated during the implementation of a program under the control of the control section 10. The display section 80 also displays image signals output from the image processor 70 in a camera mode or user data output from the control section 10. In addition, the display section 80 displays multiple thumbnail images generated from the image data stored in the memory 29 under the control of the control section 10. The display section 80 can be a Liquid Crystal Display (LCD) comprising a LCD controller, a memory for storing image data and a LCD device. When the LCD is a touch screen, it can serve as an input means like the keypad 27.

Referring to FIG. 1, if a user (caller) sets an outgoing call mode after dialing by using the keypad 27, the control section 10 will detect the mode and will process the dialed information received through the data processor 23. The control section 10 converts the dialed information into a RF signal through the RF section 21 and outputs the RF signal. A reply signal generated from a recipient is detected by the RF section 21 and the data processor 23. The audio processor 25 then forms a voice communication path so that the user can communicate with the recipient.

In contrast, when detecting an incoming call, the control section 10 controls the audio processor 25 to generate a ringing signal. When the user replies to the incoming call, the control section 10 detects the reply and controls the audio processor 25 to form a voice communication path so that the user can receive the incoming call. Although voice communications in the incoming or outgoing call mode have been described as examples, the control section 10 can also perform data communication functions for receiving or transmitting packet data or image data. In a standby mode or a messaging mode, the control section 10 displays text data processed by the data processor 23 on the display section 80.

The mobile terminal also enables the user to photograph an object or a scene in order to display or send the photographed image. The camera 50 can be embedded in the mobile terminal or mounted on the exterior of the mobile terminal. In other words, the camera 50 can be either an external or an internal component. The camera 50 may use a charge coupled device (CCD) sensor. An image photographed by the camera 50 is converted into an electrical signal in the CCD sensor and applied to the signal processor 60. Then the signal processor 60 converts the received electrical signal to a digital image data and outputs the digital image data to the image processor 70.

Hereinafter, a process of providing thumbnail images on the mobile terminal will be explained in detail. Images photographed or downloaded in the multi-mode of the image management mode are compressed and stored in the memory 29. The control section 10 analyzes the picture size and positions of DCT coefficients of each image stored in the memory 29. The control section 10 partially decodes the DCT coefficients located at different positions according to the picture size and compression format of each stored image and generates a thumbnail image to display on the display section 80.

Partial decoding is a process of decoding part of a bit stream of a stored image for generating one thumbnail image, without decoding the bit stream as a whole.

Figure 2:
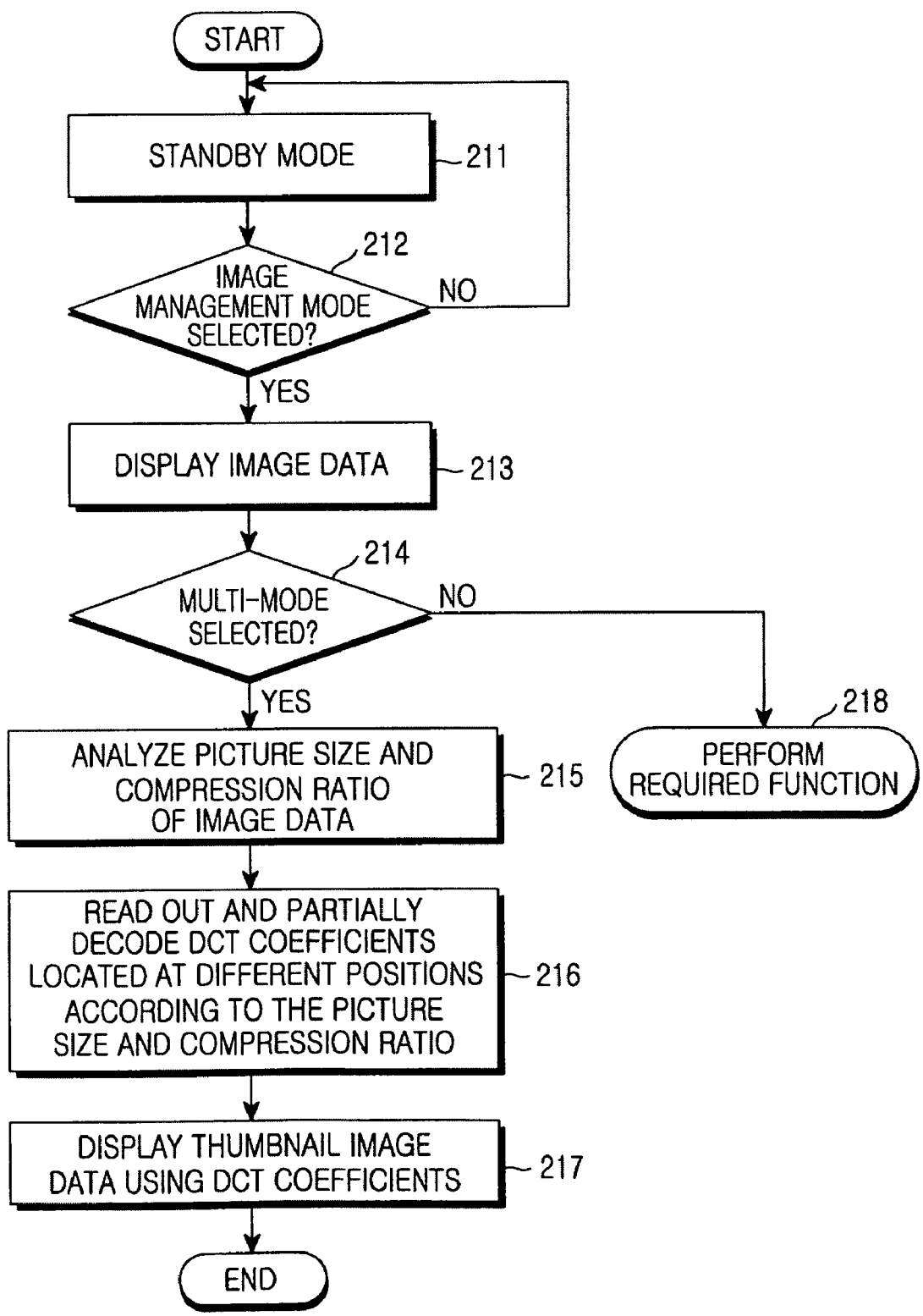
FIG. 2 is a flow chart illustrating a process of providing a thumbnail image on a mobile terminal according to an embodiment of the present invention.

FIG. 2 is a flow chart illustrating a process of providing a thumbnail image on a mobile terminal according to an embodiment of the present invention.

Referring to FIG. 2, the control section in standby mode at step 211 determines whether the image management mode is selected at step 212. Upon selection of the image management mode, the control section 10 reconstructs one of images compressed and stored in the memory 29 and displays the reconstructed image on the display section 80 at step 213.

Image data stored in the memory 29 include still images and moving images. Still images are compressed in a JPEG format, while moving images are compressed in a MPEG format. The compression of still or moving images will be briefly explained below.

A still image of an object photographed through the camera 50 is divided into 8×8 pixel blocks by the image processor 70. The DCT transforms the 64 pixels in each 8×8 block into two-dimensional spatial frequency values to obtain DCT coefficients. After quantization and entropy coding of the DCT coefficients, the still image is compressed and stored in the memory 29. Moving images in MPEG can be compressed and stored in the same manner. For moving images, however, compression ratios need be increased by effectively exploiting the correlation between frames. In other words, the compression of moving images further involves increasing compression ratios by discarding any redundant information in adjacent frames ("motion compensation") and using the displacement of the macroblock in the previous frame with respect to the macroblock in the current frame ("motion vector").

While a still image is displayed on the display section 80 at step 213, the control section 10 determines whether a multi-mode is selected at step 214. If a multi-mode is not selected at step 214, the mobile terminal performs other functions at step 218. If the multi-mode is selected at step 214, the control section 10 analyzes a picture size and a compression ratio of each image stored in the memory 29 at step 215.

Hereinafter, a bit stream of a JPEG image which varies according to the picture size and compression ratio of the image will be explained in detail with reference to FIG. 3.

Figure 3:
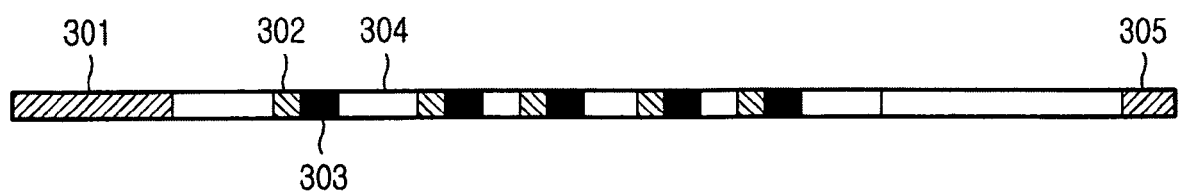
FIG. 3 is a view illustrating a bit stream of a Joint Picture Experts Group (JPEG) image for providing thumbnail image data according to an embodiment of the present invention.

FIG. 3 shows a bit stream of a JPEG image for providing thumbnail image data services according to an embodiment of the present invention.

Referring to FIG. 3, a bit stream of a JPEG still image comprises a header 301 including information representing the JPEG still image such as a picture size and a compression ratio, a block header 302 representing a sequential number of each 8×8 pixel block, DCT coefficients (DC, AC) 303 and 304 positioned next to the block header 302 and an end stream 305 indicating the end of the JPEG bit stream. The DCT coefficients 303 and 304 comprise a DC coefficient 303 representing the average value of the 8×8 pixel blocks and AC coefficients 304 representing the remaining pixel information. In an embodiment of the present invention, thumbnail image data is generated using the DCT coefficient 303.

Assuming that a photographed image can have one of four picture sizes specified by rows by columns of pixels (640× 480, 352×288, 176×176 and 176×144) and a compression ratio in one of three levels (high, middle and low), the control section 10 will analyze DCT coefficients corresponding to the twelve cases according to the possible picture sizes and compression ratios of the image.

At step 216, the control section 10 detects the positions of the DCT DC coefficients 303 located at different positions according to the picture size and compression ratio of the image and outputs the DCT DC coefficients 303.

For example, in order to generate a thumbnail of a JPEG still image stored in a picture size of 176×144 pixels, the JPEG image is divided into a total of 396 8×8 pixel blocks (22×18 blocks). The DCT DC coefficient 303 of the first block can be read out from the JPEG bit stream based on a JPEG standard format. Since the positions of the rest 395 DCT DC coefficients 303 vary according to the picture size and compression ratio of the image, the positional information of the block headers (0 to 395) 302 is obtained to extract the DCT DC coefficients 303 positioned next to the block headers 302. The extraction of DCT DC coefficients 303 is performed up to the number of times corresponding to the number of 8×8 pixel blocks which is in proportion to the picture size of an image.

The control section 10 applies the DCT DC coefficients 303 obtained by the above process and a multi-mode control signal in the image management mode to the image processor 70. The image processor 70 partially decodes the received DCT DC coefficients 303. Also, the image processor 70 reduces the partially decoded DC coefficients 303 to ⅛ and outputs pixel information of thumbnail image data to the display section 80.

At step 217, the display section 80 displays a thumbnail image having a 22×18 size based on the pixel information received from the image processor 70.

The above process as shown in FIG. 2 is repeated up to the number of times corresponding to the number of actual images stored in the memory 29, thereby generating multiple thumbnail images in realtime and displaying the thumbnail images.

Although a certain embodiment of the present invention has been described for illustrative purposes, those skilled in the art will appreciate that various modifications, additions and substitutions are possible without departing from the scope and spirit of the invention as disclosed in the accompanying claims including the full scope of equivalents thereof. Accordingly, the present invention is equally applicable to JPEG still images and MPEG moving images comprising frames of JPEG still images.

As explained above, the present invention partially decodes DCT coefficients of multiple actual images stored in the memory and generates corresponding multiple thumbnail images in real-time. Thus, it is possible to provide thumbnail images on a mobile terminal without the need to store them in the memory, thereby effectively utilizing finite memory resources.

What is claimed is:

1. A method for providing thumbnail image data on a mobile terminal, comprising:

determining whether an image management mode is selected when the mobile terminal is in a standby mode;

analyzing bit streams of a plurality of stored actual images to obtain picture sizes and compression ratios of the actual images upon selection of the image management mode;

extracting Discrete Cosine Transform (DCT) coefficients at certain blocks of the bit streams of the actual images based on the obtained picture sizes and compression ratios; and partially decoding the extracted DCT coefficients, reducing the partially decoded DCT coefficients at a predetermined rate for generating thumbnail images of the plurality of actual images and displaying the generated thumbnail images.

2. The method as claimed in claim 1, wherein said actual images have one of four picture sizes specified by rows by columns pixels comprising 640×480, 352×288, 176×176 and 176×144.

3. The method as claimed in claim 1, wherein said actual images have a predetermined number of pixel blocks according to their picture sizes.

4. The method as claimed in claim 1, wherein the extraction of said DCT coefficients is performed up to the number of times corresponding to the number of pixel blocks determined according to the picture sizes of the actual images.

5. The method as claimed in claim 4, wherein each of said pixel blocks comprise 8×8 pixels.

6. The method as claimed in claim 1, wherein said actual images comprise a compression ratio having three levels comprising a high, a middle and a low.

7. The method as claimed in claim 1, wherein said DCT coefficients represent the average value of the pixel blocks.

8. The method as claimed in claim 1, wherein said compression ratio comprises 8.

9. The method as claimed in claim 1, wherein the extraction of said DCT coefficients involves detecting a block number represented by a block header of each of a predetermined number of pixel blocks in a bit stream according to the picture size and compression ratio of each image; and extracting a first DCT coefficient of the block header.

10. An apparatus for providing thumbnail image data on a mobile terminal, comprising:

a keypad to enter commands;

a memory to store the thumbnail image data; and a controller to determine whether an image management mode is selected when the mobile terminal is in a standby mode, analyze bit streams of a plurality of stored actual images to obtain picture sizes and compression ratios of the actual images upon selection of the image management mode, extract Discrete Cosine Transform (DCT) coefficients at certain blocks of the bit streams of the actual images based on the obtained picture sizes and compression ratios, and partially decode the extracted DCT coefficients, reduce the partially decoded DCT coefficients at a predetermined rate in order to generate thumbnail images of the plurality of actual images and display the generated thumbnail images.

11. The apparatus as claimed in claim 10, wherein said actual images have one of four picture sizes specified by rows by columns pixels comprising 640×480, 352×288, 176×176 and 176×144.

12. The apparatus as claimed in claim 10, wherein said actual images have a predetermined number of pixel blocks according to their picture sizes.

13. The apparatus as claimed in claim 10, wherein the extraction of said DCT coefficients is performed up to the number of times corresponding to the number of pixel blocks determined according to the picture sizes of the actual images.

14. The apparatus as claimed in claim 13, wherein each of said pixel blocks comprise 8×8 pixels.

15. The apparatus as claimed in claim 10, wherein said actual images comprise a compression ratio having three levels comprising a high, a middle and a low.

16. The apparatus as claimed in claim 10, wherein said DCT coefficients represent the average value of the pixel blocks.

17. The apparatus as claimed in claim 10, wherein said compression ratio comprises 8.

18. The apparatus as claimed in claim 10, wherein the extraction of said DCT coefficients involves detecting a block number represented by a block header of each of a predetermined number of pixel blocks in a bit stream according to the picture size and compression ratio of each image; and extracting a first DCT coefficient of the block header.

* * * * *

UNITED STATES PATENT AND TRADEMARK OFFICE
CERTIFICATE OF CORRECTION

PATENT NO. : 7,606,432 B2  Page 1 of 1
APPLICATION NO. : 10/988577
DATED : October 20, 2009
INVENTOR(S) : Son et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1366 days.

Signed and Sealed this

Twelfth Day of October, 2010

David J. Kappos
*Director of the United States Patent and Trademark Office*